United States Patent
Hayashi et al.

(10) Patent No.: US 8,540,060 B2
(45) Date of Patent: Sep. 24, 2013

(54) DISK BRAKE

(75) Inventors: Shigeru Hayashi, Yamanashi (JP); Masatoshi Tazaki, Yamanashi (JP)

(73) Assignee: Hitachi Automotive Systems, Ltd., Kanagawa (JP)

( * ) Notice: Subject to any disclaimer, the term of this patent is extended or adjusted under 35 U.S.C. 154(b) by 492 days.

(21) Appl. No.: 12/656,164

(22) Filed: Jan. 20, 2010

(65) Prior Publication Data

US 2010/0187050 A1     Jul. 29, 2010

(30) Foreign Application Priority Data

Jan. 21, 2009 (JP) ................................. 2009-010917

(51) Int. Cl.
*F16D 55/22*     (2006.01)

(52) U.S. Cl.
USPC .................. 188/72.3; 188/1.11 W; 188/71.7; 188/73.36; 188/73.37; 188/73.38

(58) Field of Classification Search
USPC ... 188/1.11 W, 71.7, 71.8, 72.3, 73.36–73.38
See application file for complete search history.

(56) References Cited

U.S. PATENT DOCUMENTS

| | | | | |
|---|---|---|---|---|
| 4,034,857 A | * | 7/1977 | Kondo et al. | 188/73.36 |
| 4,245,723 A | * | 1/1981 | Moriya | 188/72.3 |
| 5,033,590 A | * | 7/1991 | Kobayashi et al. | 188/1.11 W |
| 5,549,181 A | * | 8/1996 | Evans | 188/72.3 |
| 5,687,817 A | * | 11/1997 | Kobayashi et al. | 188/72.3 |
| 5,934,417 A | * | 8/1999 | Kobayashi et al. | 188/72.3 |
| 5,947,233 A | * | 9/1999 | Kobayashi et al. | 188/72.3 |
| 6,223,867 B1 | * | 5/2001 | Doi et al. | 188/73.45 |
| 7,040,464 B1 | * | 5/2006 | Andrews et al. | 188/73.38 |
| 7,219,773 B2 | * | 5/2007 | Ono | 188/73.38 |
| 7,455,153 B2 | * | 11/2008 | Ooshima et al. | 188/73.38 |

FOREIGN PATENT DOCUMENTS

JP    2002-327780 A    11/2002

* cited by examiner

*Primary Examiner* — Bradley King
*Assistant Examiner* — Mahbubur Rashid
(74) *Attorney, Agent, or Firm* — Rader, Fishman & Grauer PLLC

(57) ABSTRACT

There is provided a disk brake comprising: a mounting member axially extending over a disk periphery, the mounting member including a pad guide where a friction pad travels; a caliper; and a return spring between the friction pad and the mounting member and urges the friction pad into a return direction separating from the disk, wherein the return spring includes: a first extended portion where a base end side thereof is fixed to a back plate of the friction pad while a top end side thereof extends separating from the disk; and a second extended portion folded from the top end side of the first extended portion toward the mounting member, a top of the second extended portion extending to elastically abut to the side of the mounting member, and a plate thickness direction of the first extended portion extends to be approximately a radial direction of the disk.

20 Claims, 11 Drawing Sheets

DISK BRAKE

BACKGROUND OF THE INVENTION

1. Field of the Invention

The present invention relates to a disk brake that suitably applies braking force to a vehicle such as an automobile.

2. Description of the Related Art

In general, a disk brake provided at a vehicle such as an automobile comprises: a mounting member mounted on a non-rotating portion of the vehicle where the mounting member includes a pair of arms that is separated along a rotating direction of a disk and extends over the exterior of the disk in its axial direction; a caliper slidably provided at each of the arms of the mounting member; a pair of friction pads slidably supported by each of the arms of the mounting portion through a pad spring where the pair of friction pads are pressed toward the disk by means of the caliper; and the like.

In the conventional disk brake categorized by this type, when a driver performs braking operation, a piston provided on the inner side of the caliper is adapted to slidably shift toward a side of the disk by hydraulic pressure externally supplied, whereby the friction pads provided on the inner side of the caliper are pressed toward the disk. The caliper is then slidably shifted relative to the mounting member by means of counterforce generated, so that each of the friction pads is pressed to each side of the disk between its outer leg portion and the piston so as to apply braking force to the disk rotated.

In this case, at each of the arms of the mounting portion, a pad guide in which to slidably guide the pair of friction pads in the axial direction of the disk is provided. Further, at each of the arms of the mounting portion, the pad spring in which to elastically support the pair of friction pads with each of the arms is provided. This pad spring can inhibit that the friction pads are shook relative to the pad guide of the arms, etc. whereby the friction pads can slide smoothly.

Furthermore, the friction pads extend either in the rotating direction or in the circumferential direction of the disk and comprise: a back plate where ear portions (or engagement portions) in a convex formation are provided at each end side of the back plate, the ear portions slidably engaging with the pad guide of the mounting member; and a lining made of friction materials that is provided on the surface of the back plate.

Still further, the disk brake provided with a return spring is known. The return spring works as that, when braking to the vehicle is released, the return spring urges each of the friction pads in a direction separating from each side of the disk. The return spring is provided between the mounting member and the friction pads and urges the friction pads in a return direction, that is, separating the friction pads from the disk. See, for example, Japanese Patent Application Laid-open No. 2002-327780 (to be referred to as Patent Document 1).

Moreover, the base end side of the return spring is fixed at a position corresponding to the ear portions of the back plate of the friction pads. The top end side of the return spring, on the other hand, is elastically abutted to the mounting member through the pad spring whereby the friction pads are normally urged toward a return position, that is, a position axially outside of the disk.

Here, in the conventional art as discussed above, the base end side of the return spring is fixed at the bottom side of the convex ear portions of the back plate of the friction pads while the top end side of the return spring is arranged as extending over the pad guide of the mounting member in the circumferential direction of the disk and abutting (or elastically abutting) to the side of the arms of the mounting member through the pad spring.

However, since the return spring in the conventional art is structured as that the return spring in its thickness direction is oriented toward the circumferential direction of the disk, for example, in case that the caliper is a twin-bore, and/or in case that a friction detecting portion is provided at the return spring, etc., a mounting space for layout becomes small whereby it may cause difficulties to arrange the return spring between the mounting member and the friction pads.

Still further, in case of the conventional return spring, when the friction pads are urged in the return direction separating the friction pads from the disk by releasing braking of the vehicle, there may be a case that the friction pads are inclined relative to the surface of the disk. As a result, uneven wear may occur on the friction pads, or run-out of the friction pads or brake noise may occur.

SUMMARY OF THE INVENTION

The present invention has been made in light of the above problem, and it is an object of the present invention to provide a disk brake where a mounting space for a return spring is easily secured, friction pads can be returned in a stable movement, uneven wear occurred on the friction pads can be reduced, and run-out of the friction pads or brake noise, etc. is preventable.

In order to achieve the object described above, according to a first aspect of the present invention, there is provided a disk brake comprising: a mounting member that extends over an outer periphery of a disk in its axial direction, the mounting member including a pad guide where a friction pad travels; a caliper that is movably attached on the mounting member and presses the friction pad to the disk; and a return spring that is provided between the friction pad and the mounting member and urges the friction pad into a return direction separating from the disk, wherein the return spring is composed of: a first extended portion where a base end side thereof is fixed to a back plate of the friction pad while a top end side thereof extends in a direction separating from the disk; and a second extended portion that is folded from the top end side of the first extended portion toward a side of the mounting member, a top of the second extended portion extending up to a position that is elastically abutted to the side of the mounting member, and wherein a plate thickness direction of the first extended portion extends so as to be approximately a radial direction of the disk.

According to a second aspect of the present invention, there is provided a disk brake comprising: a mounting member that extends over an outer periphery of a disk in its axial direction, the mounting member being provided with pad guides for travel of a friction pad, the pad guides being each separated in a rotational direction of the disk; a caliper that is movably provided with the mounting member and presses the friction pad to the disk by means of a piston installed; and a return spring made of a metallic plate that is provided between the friction pad and the mounting member and urges the friction pad in a return direction separating from the disk, wherein the return spring is composed of: a fixing portion that is fixed to the friction pad; and an extended portion where the extended portion is formed by being bent from the fixing portion as that a plate thickness direction of the extended portion is arranged to be approximately in a radial direction of the disk, the extended portion extending in a direction separating from the disk, and a top end side of the extended portion is bent toward a side of the mounting member and elastically abutted to a side of the mounting member.

According to a third aspect of the present invention, there is provided a disk brake comprising: a mounting member wherein a pad guide that extends over an outer periphery of a disk in its axial direction for travel of a frictional pad and a torque receiver that receives braking torque from the friction pad are arranged side by side in a radial direction of the disk; a caliper that is movably provided at the mounting member and presses the friction pad to the disk by means of a piston installed; a return spring made of a metallic plate that is provided between the friction pad and the mounting member and urges the friction pad in a return direction separating from the disk, wherein the return spring is composed of: a fixing portion that is fixed to the friction pad; and an extended portion that extends in a direction separating from the disk where a top end side of the extended portion if folded toward a side of the mounting member and elastically abutted to a region corresponding to the torque receiver of the mounting member in a radial direction of the disk.

As recited hereinabove, according to the present invention, it will be easy to find the space for mounting the return spring between the back plate of the friction pads and the side of the mounting member. Further, since only a small mounting space will be required for mounting the return spring, it is possible to offer more choices for layout design.

DETAILED DESCRIPTION OF THE PREFERRED EMBODIMENTS

Figure 1:
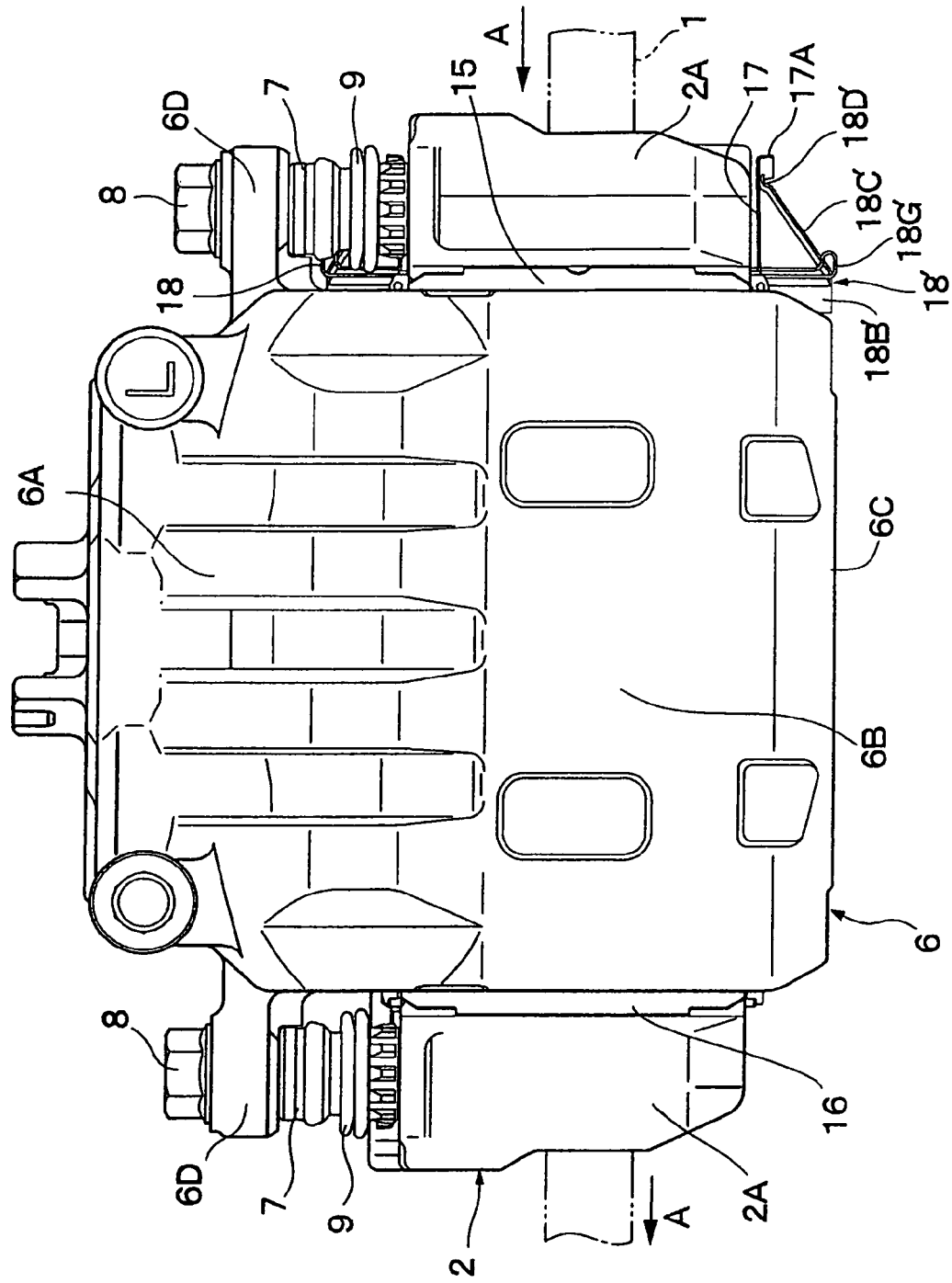
FIG. 1 is a plan view showing a disk brake according to the embodiment of the present invention.

Hereinafter, a disk brake according to the embodiments of the present invention will be explained in detail with reference to the accompanying drawings.

FIGS. 1 to 16 show the embodiments of the present invention. In these FIGS, a reference numeral 1 indicates a disk to be rotated. This disk 1 rotates with wheels (not shown) in an arrow A direction in FIG. 1 when, for example, a vehicle runs in a forward direction.

A reference numeral 2 is a mounting member as a carrier that is mounted on a non-rotating portion of the vehicle. This mounting member 2, as shown in FIGS. 1 and 2, comprises: a pair of arms 2A, 2A extending in the axial direction of the disk so that each of the arms 2A, 2A is separated from each other along the rotating direction (circumferential direction) of the disk 1, and extends over the outer periphery of the disk 1; a thick supporting portion 2B fixed to the non-rotating portion of the vehicle which is placed on the inner side of the disk 1 in such a manner that the supporting portion 2B is integrally formed so as to connect each base side of the arms 2A, 2A; and the like.

Further, the mounting member 2 is provided with a reinforcing beam 2C connecting the tip side of each of the arms 2A, 2A with each other at the outer side of the disk 1, the reinforcing beam 2C being formed into in a semi-elliptic form by being integrally molded. Accordingly, each of the arms 2A, 2A of the mounting member 2 is integrally connected with each other through the supporting portion 2B at the inner side of the disk 1, and also integrally connected with each other through the reinforcing beam 2C at the outer side of the disk 1.

Figure 2:
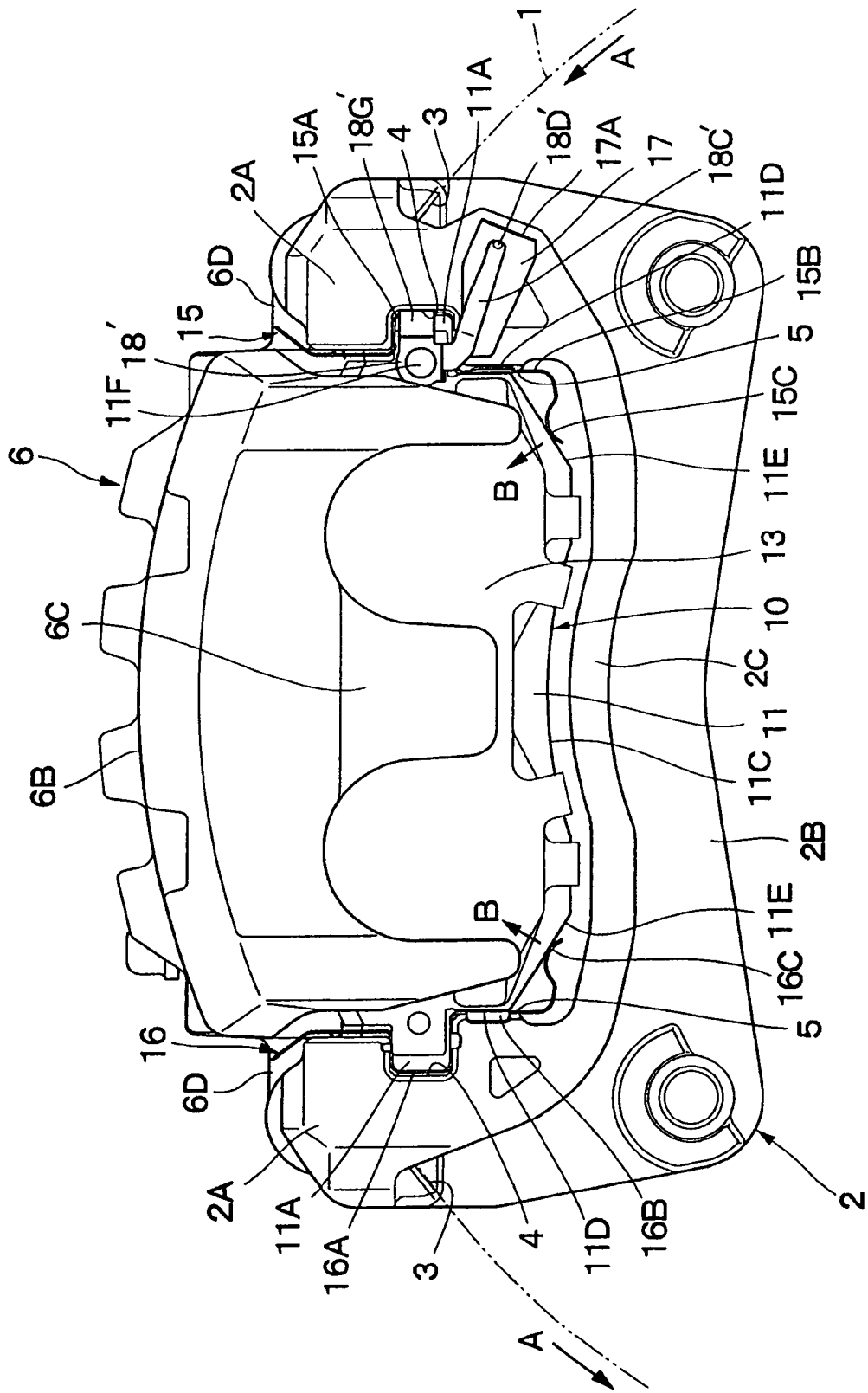
FIG. 2 is a front view seeing the disk brake of the FIG. 1 from the outer side of a disk.

Still further, at the intermediate portion of the arm 2A in its lengthwise direction (or in the axial direction of the disk 1), as shown in FIG. 2, a disk path portion 3 is formed extending in a circular arc direction along the outer periphery (or the rotational track) of the disk 1. At each side of the disk path portion 3 (at both sides in the axial direction of the disk 1), pad guides 4, 4 of both the inner side and the outer side of the disk 1 are each formed. Moreover, each of the arms 2A, 2A is provided with a pin hole (not shown), and a slide pin 7 later explained is to be slidably inserted into each of the pin holes.

Figure 3:
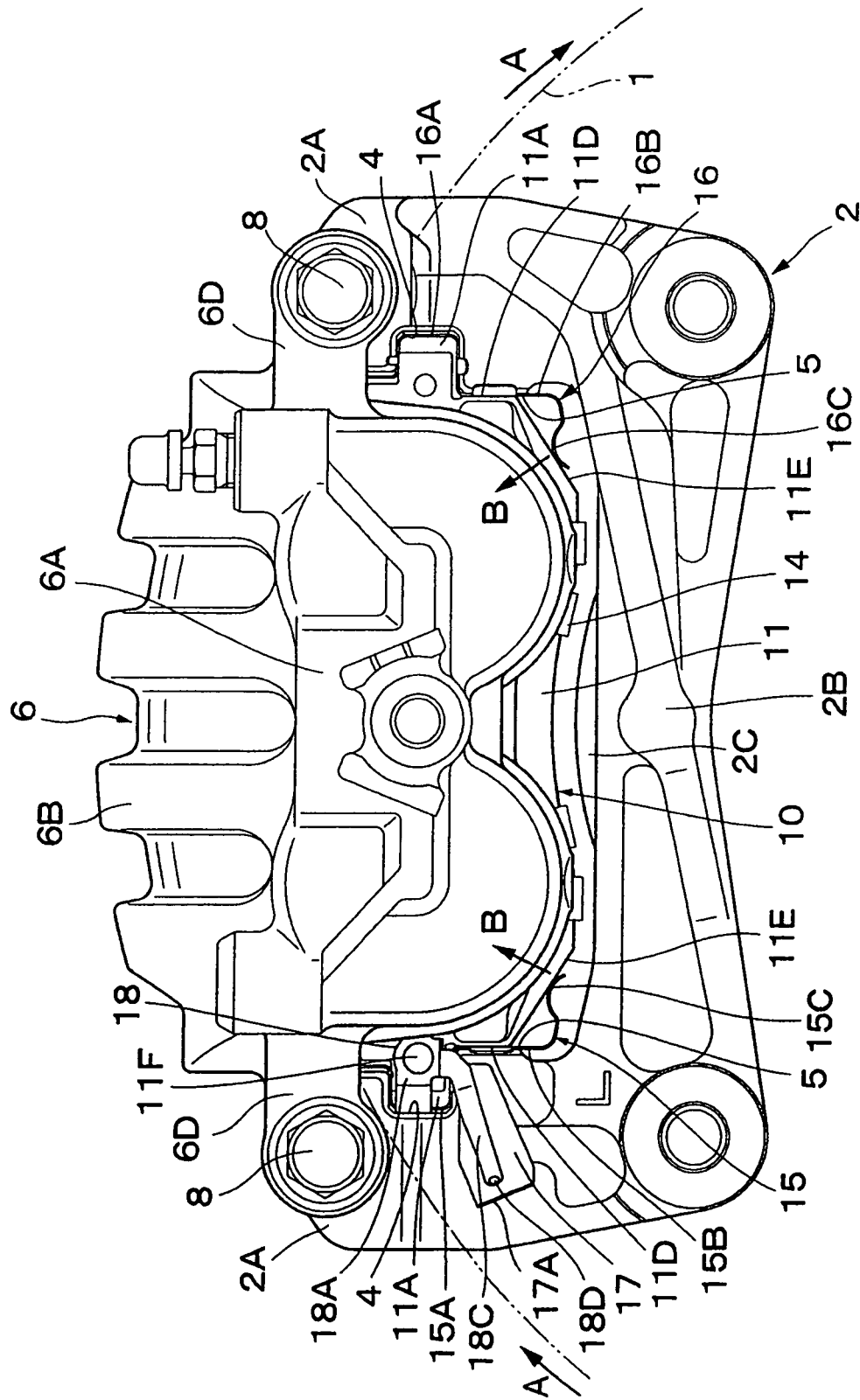
FIG. 3 is a rear view seeing the disk brake of FIG. 1 from the inner side of the disk.

Reference numerals 4, 4, . . . indicate the pad guides provided at each of the arms 2A, 2A of the mounting member 2. These pad guides 4 are formed into a concave groove that is a U-shape in section as shown in FIGS. 2 and 3, the pad guides 4 extending in a direction where a later-explained friction pad 10 is slidably deviated (in the axial direction of the disk 1). Further, these pad guides 4 are placed at each side of the disk path portion 3 in its axial direction, and arranged at the base end side (the inner side) and the top end side (the outer side) of each of the arms 2A, 2A so as to sandwich the disk path portion 3.

Here, the pad guides 4 are formed into a concave groove having a U-shape in section as to sandwich a later-explained ear portion 11A of the friction pad 10 in a vertical direction (in the radial direction of the disk 1). The pad guides 4 work to slidably guide the friction pad 10 in the axial direction of the disk 1 together with later-explained pad springs 15, 16.

Reference numerals 5, 5, . . . indicate torque receivers provided at each of the arms 2A, 2A of the mounting member 2, the torque receivers 5 being positioned inside of each of the pad guides 4 in the radial direction of the disk 1. Further, these torque receivers 5 are, as shown in FIGS. 2 and 3, formed to be approximately orthogonal relative to the lower wall surface of the pad guides 4, etc. and work as flat reception surfaces extending inside of the disk 1 in its radial direction. Moreover, the torque receivers 5 are, as the same with each of the pad guides 4, provided at each side of the disk path portion 3 in its axial direction (at both sides of the disk 1), and each arranged at both the base end side (the inner side) and the top end side (the outer side) of each of the arms 2A, 2A.

Here, among these torque receivers 5, the torque receiver 5 positioned on the output side of the disk 1 rotated in the arrow A direction (to be referred to as rotating output side) will receive braking torque where the later-explained friction pad 10 receives from the disk 1 during braking operation through a flat surface portion 11D of a back plate 11 and a later-explained hanging plate portion 16B of the pad spring 16. On the other hand, the torque receiver 5 positioned on the input side of the disk 1 rotated in the arrow A direction (to be referred to as rotating input side) is arranged to be slightly apart from the flat surface portion 11D of the friction pad 10 via a hanging plate portion 15B of the pad spring 15.

Reference numeral 6 indicates a caliper slidably provided at the mounting member 2, and as shown in FIG. 1 the caliper 6 comprises: an inner leg portion 6A provided at one side (the inner side) of the disk 1; a bridge portion 6B that is placed between each of the arms 2A, 2A of the mounting member 2 and extends from the inner leg portion 6A to the other side (the outer side) of the disk 1 so as to extends over the outer periphery of the disk 1; and an outer leg portion 6C that extends from the top end side (the outer side) of the bridge portion 6B to the inside of the disk 1 in its radial direction, the outer leg portion having a plurality of claw portions at the top end side thereof.

Further, the inner leg portion 6A of the caliper 6 is formed with a pair of twin-bore cylinders (not shown) into which two pistons, for example, are slidably inserted. Still further, the inner leg portion 6A is also provided with a pair of installation portions 6D, 6D projecting in a right-and-left direction in FIGS. 1 and 3. These installation portions 6D, 6D will make the whole of the caliper 6 slidably supported by each of the arms 2A, 2A of the mounting member 2 through a later-explained sliding pin 7.

Reference numerals 7, 7 indicate the sliding pins working as a supporting member making the caliper 6 to be slidably supported by the mounting member 2. These sliding pins 7 are, as shown in FIG. 1, fastened to each of the installation portions 6D, 6D of the caliper 6 by means of bolts 8. The top end side of each of the sliding pins 7, 7 extends toward the interior (the aforementioned pin hole) of each of the arms 2A, 2A of the mounting member 2. Further, the top end side of each of the sliding pins 7, 7 is to be slidably inserted into each of the arms 2A, 2A (the pin hole) of the mounting member 2. The caliper 6 is slidably supported by each of the arms 2A, 2A of the mounting member 2 through the sliding pins 7, 7.

Reference numerals 9, 9 indicate protection boots that externally protect each of the sliding pins 7, 7 where each of the protection boots 9, 9 is formed into a bellows tube made by elastic resin materials, etc. Each end side of the protection boots 9, 9 is fixed to each of the arms 2A, 2A and the sliding pins 7. The protection boots 9, 9 cover the circumference of the base end side of the sliding pins 7 so as to prevent rainwater, etc. from penetrating into the pin holes of the sliding pins 7 and the arms 2A, 2A.

Reference numerals 10, 10 are the inner-side and outer-side friction pads arranged so as to face each side of the disk 1. These friction pads 10, 10, as shown in FIGS. 2 and 3, comprise: the flat back plate 11 extending in the circumferential direction (the rotational direction) of the disk 1; a lining 12 (see FIGS. 5 and 7) as friction materials that is fixed to the surface side of the back plate 11 and makes frictional contacts to the surface of the disk 1; and the like. Further, the back plate 11 of the friction pad 10 is provided with the convex ear portions 11A, 11A as engaging portions on each side of the back plate 11 in its lengthwise direction (in the circumferential direction of the disk 1).

Here, each of the ear portions 11A, 11A of the back plate 11 is slidably inserted into each of the pad guides 4 of the mounting member 2 through each of later-explained guide plates 15A, 16A of the pad springs 15, 16. The inner and outer side friction pads 10 are pressed toward each side of the disk 1 by means of the caliper 6 during braking operation. Here, each of the ear portions 11A, 11A of the back plate 11 is slidably deviated in the axial direction of the disk 1 along the pad guides 4.

Figure 4:
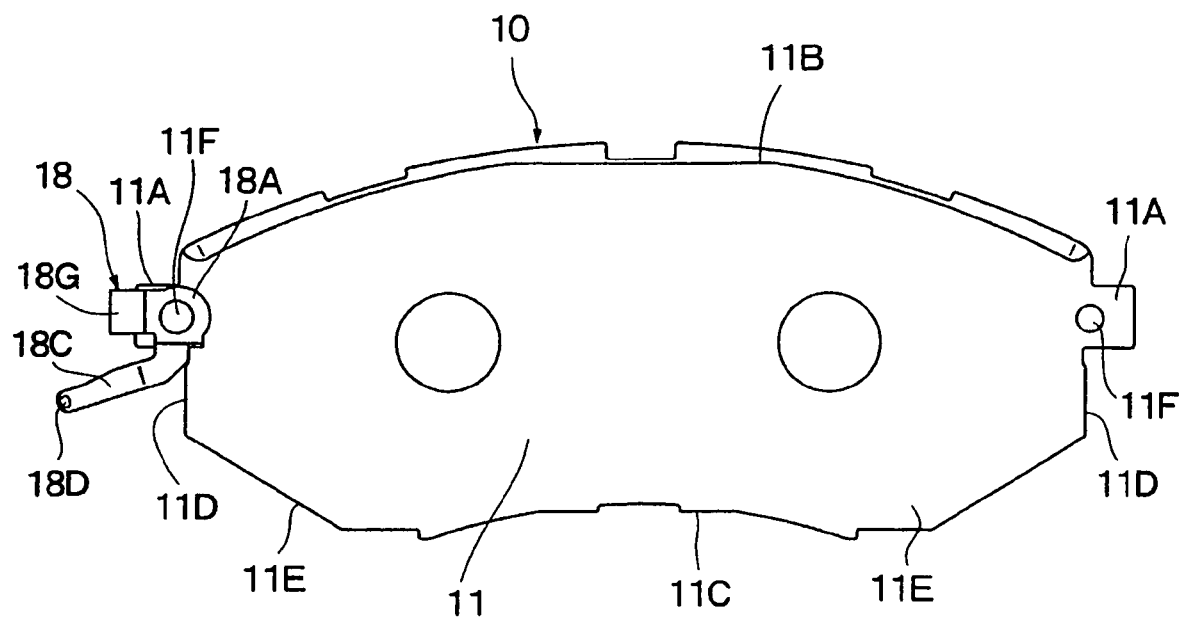
FIG. 4 is an expanded front view that a return spring of the inner side of the disk is installed into a friction pad of the inner side of the disk.
Figure 6:
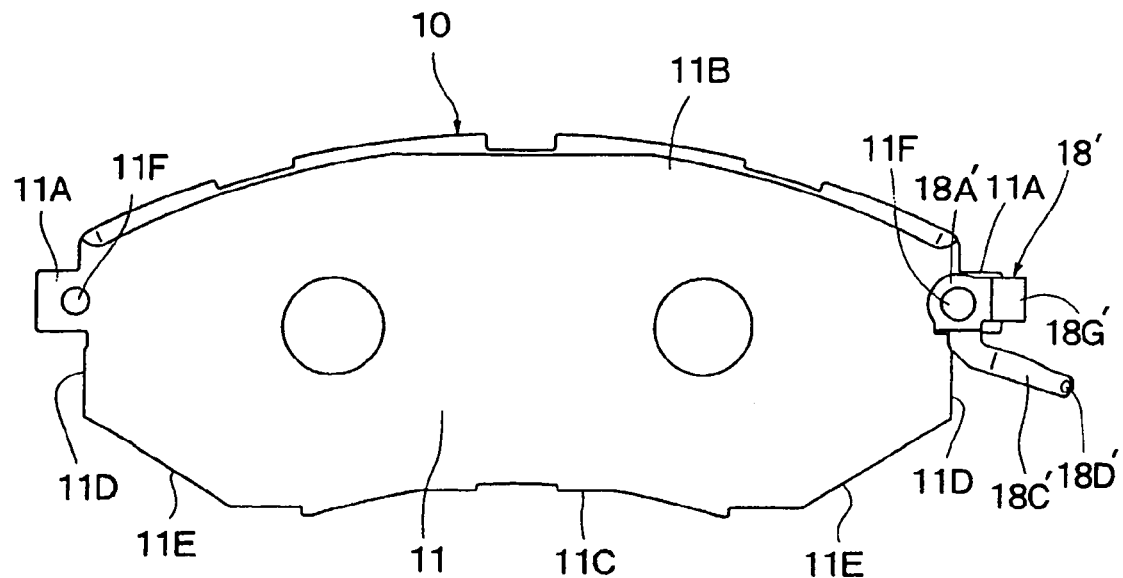
FIG. 6 is an expanded front view that a return spring of the outer side of the disk is installed into a friction pad of the outer side of the disk.

As shown in FIGS. 4 and 6, the back plate 11 of each of the friction pads 10 is overall formed into a flat material with a sector form, and comprises: an external diameter portion 11B of the external periphery side thereof; and an inner diameter portion 11C of the inner periphery side thereof, both extending in an arcuate manner. Still further, at each side of the back plate 11 in its lengthwise direction (in the rotating input side and the rotating output side of the disk 1), the flat surface portions 11D, 11D that are approximately perpendicular to the ear portions 11A, 11A in their projecting direction are provided, the flat surface portions 11D, 11D both extending toward the inner side of the disk 1 in its radial direction. Moreover, right and left inclined surfaces 11E, 11E are formed between each of the flat surface portions 11D, 11D and the inner diameter portion 11C.

Later-explained pad urging portions 15C, 16C of the pad springs 15, 16 elastically abut to the inclined surfaces 11E, 11E of the friction pads 10 (the back plate 11). Accordingly, the friction pads 10 are normally urged in arrows B, B directions in FIGS. 2, 3 (in a direction perpendicular to each of the inclined surfaces 11E, 11E, and also inclined radially outside of the disk 1 as well as circumferentially inside of the disk 1).

The back plates 11 of the friction pads 10 are provided with right and left caulking portions 11F, 11F placed rather at the base end (bottom) side of each of the ear portions 11A, 11A. Still further, among these caulking portions 11F, 11F, the caulking portion 11F placed on the rotating input side of the disk 1 is subjected to caulking for fixing later-explained return springs 18, 18' to the back plates 11 of the friction pads 10.

On the other hand, between the flat surface portions 11D, 11D of the friction pad 10 (the back plate 11), the flat surface portion 11D placed on the rotating output side of the disk 1 keeps attachment to the arm 2A (the torque receiver 5) placed on the rotating output side of the mounting member 2 through the hanging plate portion 16B of the pad spring 16 due to braking torque where the friction pads 10 receive from the disk 1 when, for example, braking operation of the vehicle is performed. Accordingly, the braking torque during the braking operation is received by the attached surface between the flat surface portion 11D and the arm 2A.

Here, in the outer-side friction pads 10 as shown in FIG. 2, the back surface side of the back plate 11 is removably provided with a shim plate 13 for noise prevention. Further, in the inner-side friction pads 10 as shown in FIG. 3, the back surface of the back plate 11 is removably provided with a shim plate 14 also for noise prevention.

Reference numeral 15 is the pad spring arranged on the rotating input side of the disk 1. The pad spring 15 is attached to the arm 2A placed on the rotating input side between each of the arms 2A, 2A of the mounting member 2. Further, the pad spring 15 and the later-explained pad spring 16 placed on the rotating output side will elastically support the inner-side and the outer side friction pads 10 therebetween, and make the sliding deviation of the friction pads 10 to be smooth. Still further, the pad spring 15 placed on the rotating input side is formed by bending (press molding) a springy metallic plate (for example, a stainless steel plate, etc.) as shown in FIGS. 1 to 3 so as to be integrally formed with a later-explained abutting plate portion 17.

Here, this pad spring 15 is bent into approximately a U-shape so as to be fixed into each of the pad guides 4 of the mounting member 2, and includes: a pair of the guide plates 15A separated from each other toward the inner side and the outer side of the disk 1; the hanging plate portions 15B of the inner side and the outer side of the disk 1 extending downward from the bottom end side of each of the guide plates 15A (inside of the disk 1 in its radial direction) to a portion defined between each of the flat surface portions 11D of the friction pads 10 (the back plate 11) and the torque receiver 5; and the pad urging portions 15C of the inner side and the outer side of the disk 1 that are formed by bent into approximately an L or S shape, the pad urging portions 15C extending from the bottom end of the hanging plate portions 15B (the inner side portion of the disk 1 in its radial direction) to the inside of the disk 1 in its rotating direction or in its circumferential direction.

Moreover, each of the guide plates 15A of the pad spring 15 is mounted by fixation into each of the pad guides 4 of the mounting member 2 as shown in FIGS. 2 and 3, and guides the back plate 11 of the friction pad 10 in the axial direction of the disk 1 through the convex ear portion 11A. Still further, each of the pad urging portions 15C of the pad spring 15 elastically abuts to each of the inclined surfaces 11E of the back plate 11 so as to elastically urge the back plate 11 of the friction pad 10 in the arrow B.

Reference numeral 16 is a pad spring placed on the rotating output side of the disk 1. The pad spring 16 is mounted on the arm 2A placed on the rotating output side between each of the arms 2A, 2A of the mounting member 2. The pad spring 16 and the pad spring 15 placed on the rotating input side will elastically support the inner-side and the outer side friction pads 10 therebetween, and make the sliding deviation of the friction pads 10 to be smooth.

The pad spring 16 placed on the rotating output side is structured approximately as the same with the aforementioned pad spring 15 placed on the rotating input side, and as shown in the FIGS. 2 and 3, comprise: the inner-side and the outer-side guide plates 16A; the hanging plate portion 16B; the pad urging portion 16C; and the like. However, the abutting plate portion 17 later explained is provided only at the pad spring 15 placed on the rotating input side but not at the pad spring 16 placed at the rotating output side. Those pad spring 15 and pad spring 16 are different from each other in this regard.

Reference numeral 17, 17 indicate abutting plate portions integrally provided with the pad spring 15 placed on the rotating input side. The base end side of each of the abutting plate portion 17, 17 is, as shown in FIGS. 1 to 3, integrally formed at the inner-side and the outer-side of the guide plate 16A of the pad spring 15. Further, the top end side of each of the abutting plate portion 17, 17 is, as exemplified in the FIG. 1, slightly separated from the arm 2A of the mounting portion 2, and extends aslant toward the outside of the disk 1 in its circumferential direction (in a direction opposite to the rotating direction A of the disk 1) so as to be a free end.

The abutting plate portion 17 on the free-end side is, as shown in FIGS. 2 and 3, formed into a plate-like shape that is wider than the later-explained return springs 18, 18' whereby the free-end side of the abutting plate portion 17 works as a bearing surface to which the return springs 18, 18' abut in an elastically deformed condition. Further, the top end side of the abutting plate portion 17 is, as exemplified in FIG. 1, provided with a curved piece portion 17A bent toward the outside of the disk 1 in its axial direction so as to form an L-shape. Later-explained projection portions 18D, 18D' of the return springs 18, 18' are capable to contact to or detach from the curved piece portion 17A. Still further, it is possible to structure the abutting plate portion 17 as to extend aslant from the hanging plate portion 15B of the pad spring 15 to the outside of the disk 1 in its circumferential direction (in a direction opposite to the rotating direction A of the disk 1).

Figure 5:
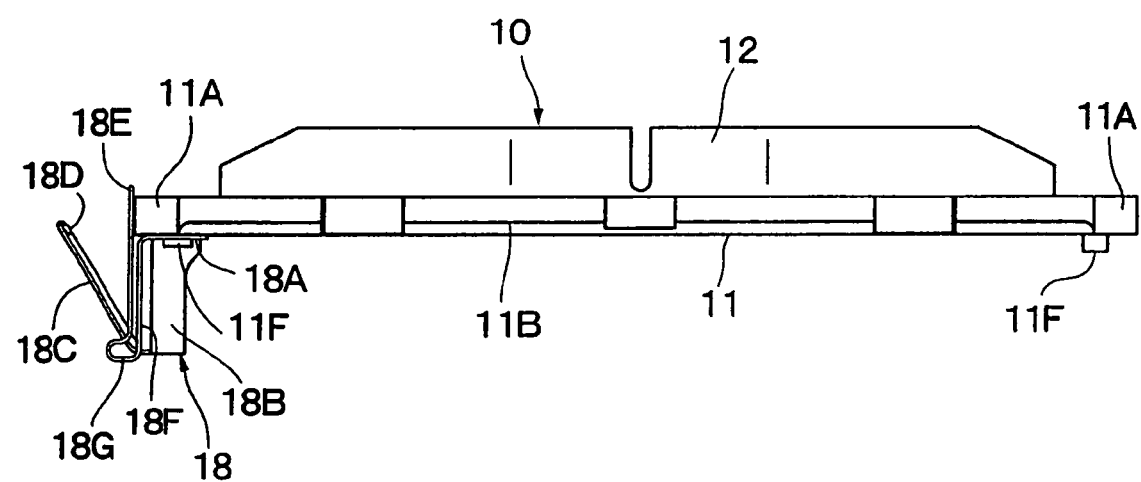
FIG. 5 is a plan view showing the friction pad of the inner side of the disk and the return spring of the inner side of the disk illustrated in FIG. 4.
Figure 7:
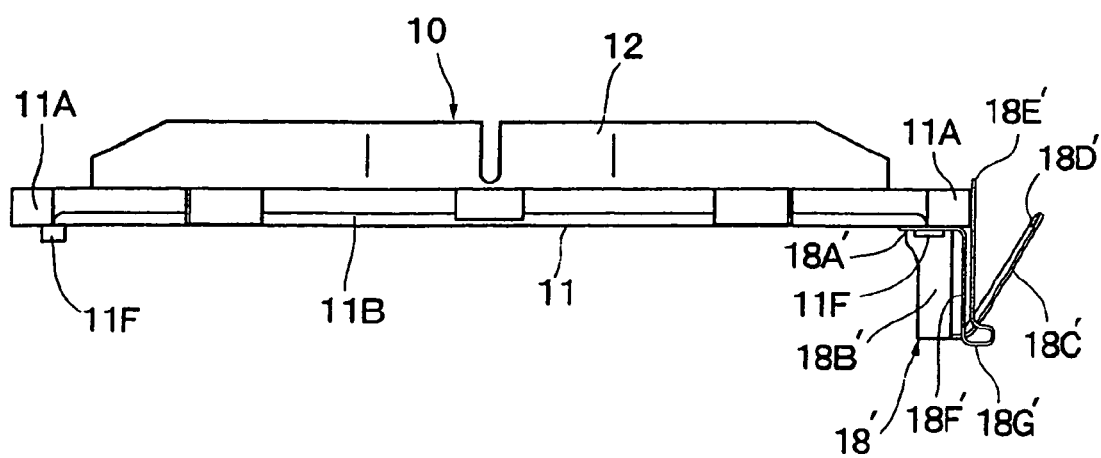
FIG. 7 is a plan view showing the friction pads of the outer side of the disk and the return spring of the outer side of the disk illustrated in FIG. 6.
Figure 8:
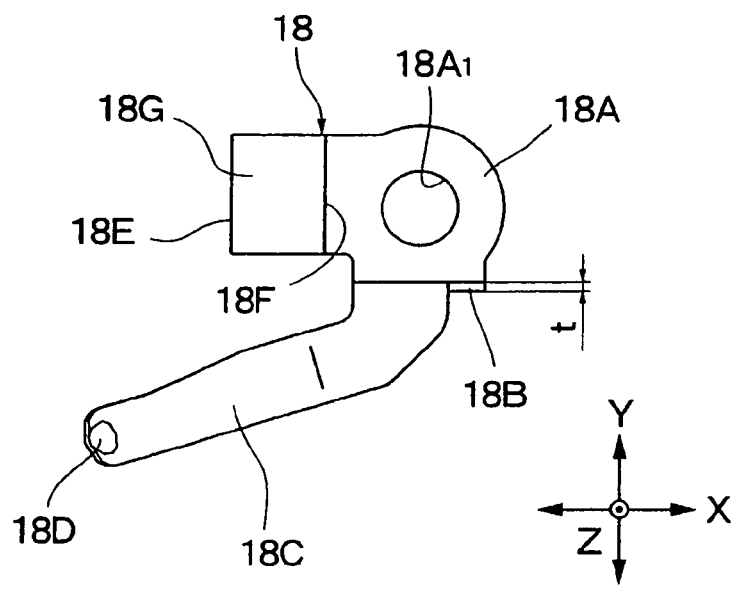
FIG. 8 is a front view expanding the return spring of FIG. 4 as a unit.
Figure 9:
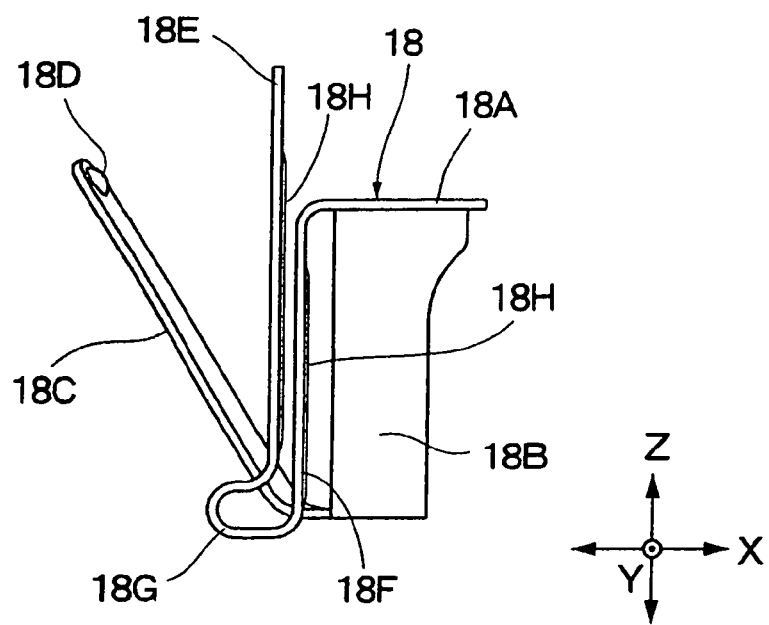
FIG. 9 is a plan view of the return spring of FIG. 8.
Figure 10:
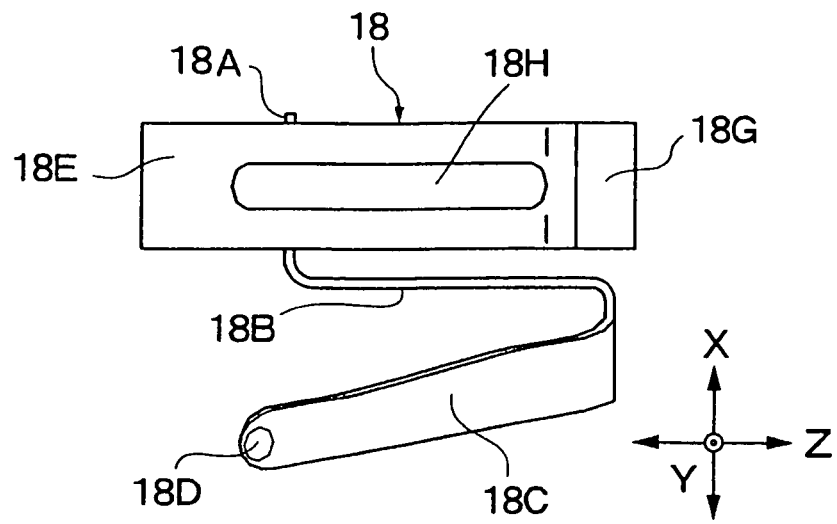
FIG. 10 is a left side view of the return spring of FIG. 8.
Figure 11:
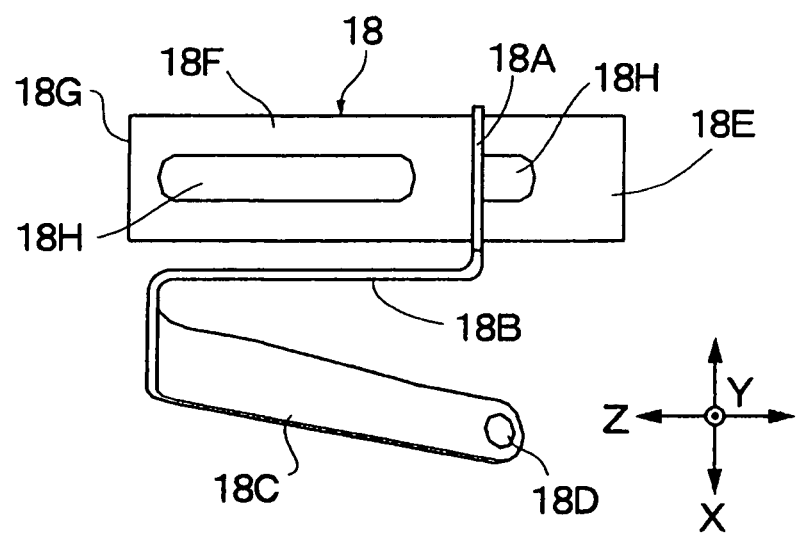
FIG. 11 is a right side view of the return spring of FIG. 8.
Figure 12:
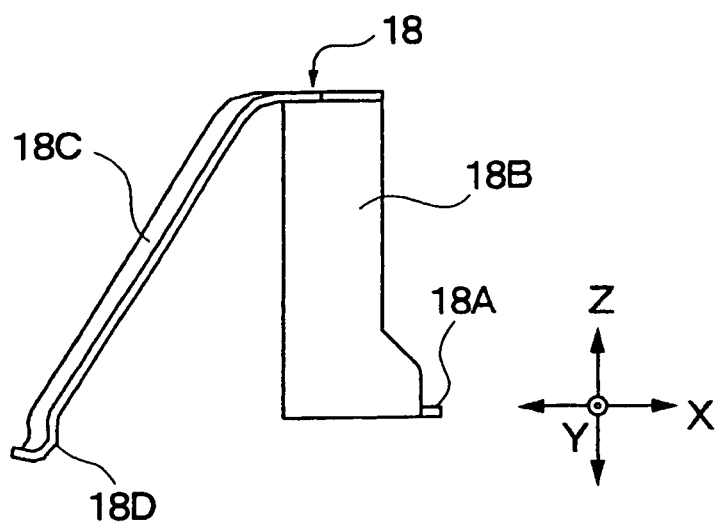
FIG. 12 is a bottom view of the return spring of FIG. 8.
Figure 13:
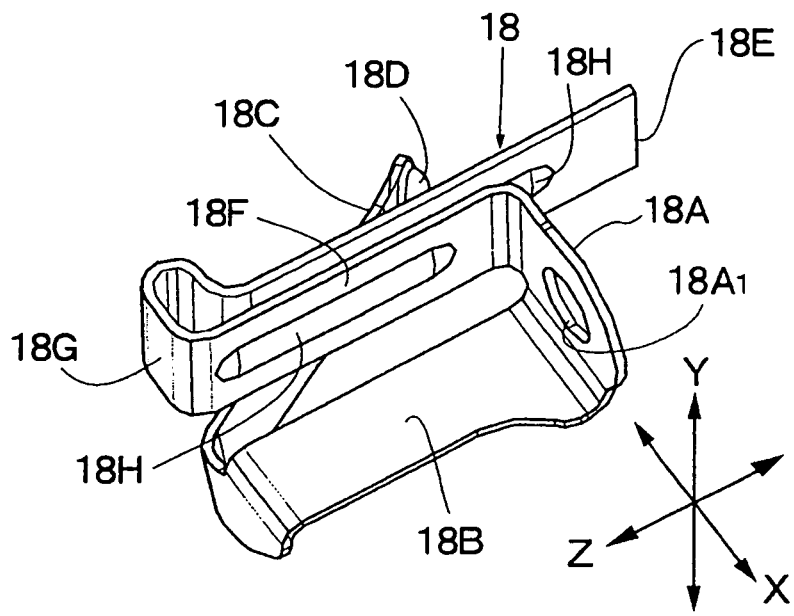
FIG. 13 is a perspective view of the return spring of the inner side of the disk.

Reference numerals 18, 18' indicate the return springs that urge the friction pads 10 of the inner side and the outer side of the disk 1 to separate from the disk 1. Here, the inner-side return spring 18 is, as shown in FIGS. 3 to 5, installed into the back plate 11 of the inner-side friction pad 10 while the outer-side return spring 18' is, as shown in FIGS. 6 and 7, installed into the back plate 11 of the outer-side friction pad 10. Further, the inner-side and the outer-side of the return springs 18, 18' are formed by the same return spring material 20 (see FIGS. 15 and 16) but only different in that the upper surface and the back surface of a later-explained return spring material 20 are each bent in an inverse direction.

To be more specific, the inner-side return spring 18 comprises: as shown in FIGS. 3 to 5, a flat-plate fixing portion 18A that is fixed on the side of the ear portion 11A of the friction pad 10 (the back plate 11) by means of the caulking portion 11F; a first extended portion 18B that is bent into an L-shape upright from the fixing portion 18A, the top end side of which being perpendicularly separated from the surface of the disk 1; a second extended portion 18C that is bent from the top end side of the first extended portion 18B to the curved piece portion 17A of the abutting plate portion 17 (or the arm 2A of the mounting member 2) and extends to a position where the second extended portion 18C elastically abuts to the abutting plate portion 17; a wear detecting portion 18E; and the like.

Here, the base end portion of the first extended portion 18B of the return spring 18 is integrally formed at the fixing portion 18A. Further, in order to make the thickness t direction of the first extended portion 18B approximately correspondent to the radial direction of the disk 1, the first extended portion 18B is oriented in a Y axis direction as exemplified in FIGS. 8 to 13. That is, supposing that an axis that is perpendicular relative to the Y axis and extends horizontally is set to an X axis, and a direction perpendicular relative to both the X and Y axes is set to a Z axis, the first extended portion 18B extends like rising up from the fixing portion 18A in the Z axis direction. The plate width direction of the first extended portion 18B corresponds to the X axis while the plate thickness direction t thereof corresponds to the Y axis direction.

In the above case, the X axis direction approximately corresponds to the circumferential direction (more precisely the horizontal direction) of the disk 1 rotating in the arrow A direction as shown in FIGS. 1 to 3. The Y axis direction approximately corresponds to the radial direction of the disk 1 while the Z axis direction corresponds to the axis direction of the disk 1. Moreover, the fixing portion 18A of the return spring 18 is arranged in parallel with a flat surface formed by the X and Y axes, and the plate thickness direction of the fixing portion 18A is oriented in the Z axis direction. In addition, at the center of the fixing portion 18A, a caulking hole 18A1 into which the caulking portion 11F of the back plate 11 is inserted and fixed is provided. See FIG. 8.

The second extended portion 18C is bent from the top end of the first extended portion 18B so as to approximately form a U-shape. As discussed hereinabove, the second extended portion 18C extends aslant to the side of the curved piece portion 17A (the arm 2A of the mounting member 2) of the abutting plate portion 17, the second extended portion 18C also slightly being twisted. Further, the convex projection portion 18D is formed on the top end side of the second extended portion 18C through drawing (pressing), the projection portion 18D projecting toward the surface side of the abutting plate portion 17. The projection portion 18D is formed as a hemispherical convex portion that is circular or oval form so that the projection portion 18D makes a line contact (nearly point contact) with the surface of the abutting plate portion 17.

The return spring 18 is integrally formed with the wear detecting portion 18E that detects whether the lining 12 of the friction pad 10 is worn out or not. Here, the return spring 18 integrally comprises: as shown in FIGS. 8 to 13, a folding piece portion 18F that is bent into an L-shape as to perpendicularly rise up from the fixing portion 18A at a position spaced from the first extended portion 18B in the X and Y axes direction, the top end side of which extends in the Z direction that is perpendicularly spaced from the surface of the disk 1; and a turnover portion 18G that is formed by turning up the top end side of the folding piece portion 18F by two steps so as to form approximately a U-shape or an L-shape.

The wear detecting portion 18E is integrally connected with the folding piece portion 18F through the turnover portion 18G, and extends in parallel (a reverse direction in the Z axis) with the folding piece portion 18F with a small clearance in the X axis direction. In this case, the wear detecting portion 18E and the folding piece portion 18F are arranged to be a position that the both of them become approximately perpendicular relative to the first extended portion 18B. Further, the wear detecting portion 18E and the folding piece portion 18F also extend approximately in parallel with a plane defined by the Y and Z axes. In addition, the top end side of the wear detecting portion 18E projects in the Z axis direction from the fixing portion 18A by a predetermined amount.

Accordingly, the wear detecting portion 18E projects from the surface of the back plate 11 in the thickness direction of the lining 12 (in the Z axis direction) in a condition that the return spring 18 is installed, as shown in FIG. 5, into the back plate 11 of the friction pad 10. Then, in case that the lining 12 is intensely worn out so as to become thinner than a predetermined level, the tip of the wear detecting portion 18E will make a direct contact with the disk 1 so as to produce so-called wear detection sound.

Based on the above, the plate thickness directions of both the wear detecting portion 18E and the folding piece portion 18F are oriented in the X axis direction (approximately in the circumferential direction of the disk 1). For example, in case that the tip of the wear detecting portion 18E is in contact with the disk 1 rotated in the arrow A direction in FIG. 3, the tip will be elastically and easily deformed into the arrow A direction. Further, at the wear detecting portion 18E and the folding piece portion 18F, reinforcing ribs 18H are each formed by means of an embossing finish, etc.

Here, in the return spring 18, a plurality of return spring materials 20 can be formed by molding from a springy metallic plate 19 (see FIG. 15) such as stainless steel plate, etc. by means of press molding. These return spring materials 20 each comprise: a fixing portion 20A; a first extended portion 20B; a second extended portion 20C; a projection portion 20D; a wear detecting portion 20E; a folding piece portion 20F; and a turnover portion 20G.

By providing press work (bending or drawing) to the return spring materials 20, that is, the fixing portion 20A, the first extended portion 20B, the second extended portion 20C, the projection portion 20D, the wear detection portion 20E, the folding piece portion 20F and the turnover portion 20G, the inner-side return spring 18 integrally includes, as shown in FIGS. 8 to 13, the fixed portion 18A, the first extended portion 18B, the second extended portion 18C, the projection portion 18D, the wear detecting portion 18E, folding piece portion 20F and the turnover portion 18G.

Figure 14:
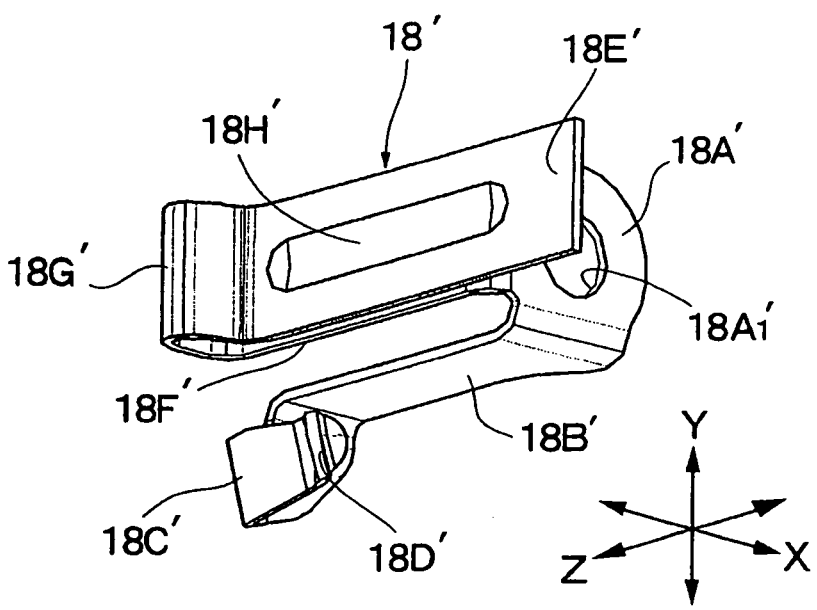
FIG. 14 is a perspective view of the return spring of the outer side of the disk.
Figure 15:
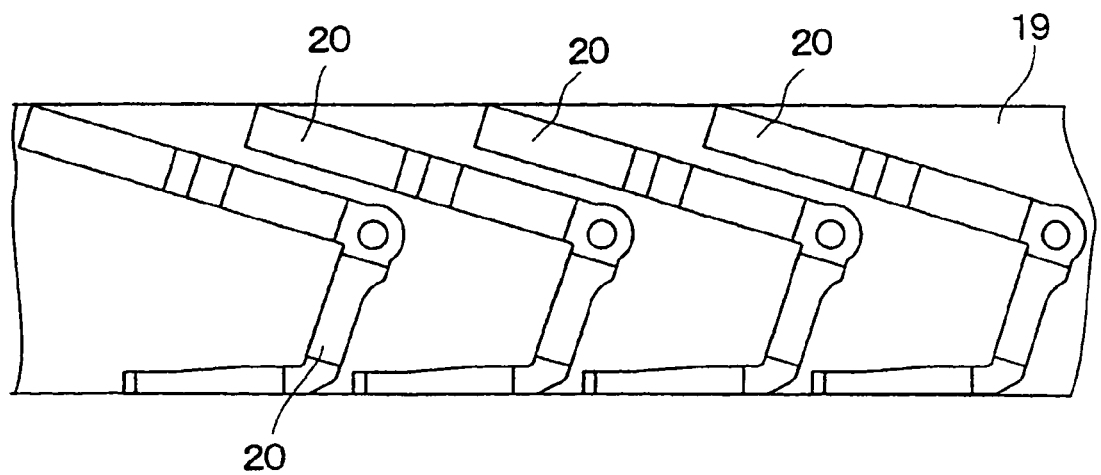
FIG. 15 is a front view showing a metallic plate that molds materials of the return spring.
Figure 16:
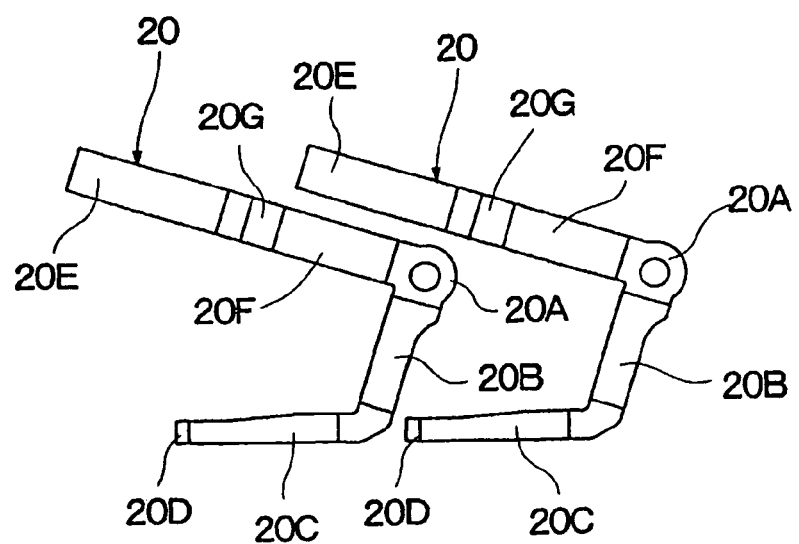
FIG. 16 is a front view showing the materials of the return spring that has been molded.

In addition, as to the outer-side return spring 18', by making the inner-side return spring 18 turned upside down and bent in a reverse direction in bending process of the return spring materials 20, as shown in FIG. 14, a fixing portion 18A' with a caulking hole 18A1', a first extended portion 18B', a second extended portion 18C', a projection portion 18D', a wear detecting portion 18E', a folding piece portion 18F' and a turnover portion 18G' can be integrally formed.

Furthermore, the fixing portions 18A, 18A' placed on the base end side of the return springs 18, 18', as shown in FIGS. 4 to 7, relative to the inner-side and the outer-side friction pads 10, are fixed to the ear portion 11A of the back plate 11 placed on the rotating input side of the disk 1, or in the vicinity of the ear portion 11A through the caulking portion 11F. Still further, the second extended portions 18C, 18C' of the return springs 18, 18' are, as shown in FIGS. 2 and 3, arranged at a position that extends over the abutting plate portion 17 of the pad spring 15, etc. from a portion defined between the pad guide 4 and the torque receiver 5 placed on the rotating input side of the disk 1. The second extended portions 18C, 18C' thus extend along the rotation direction of the disk 1 (substantially, in a direction opposite to the arrow A).

The first extended portions 18B, 18B' of the return springs 18, 18' rise up from the fixing portions 18A, 18A' (the back surface of the back plate 11) to a direction separated from the outside of the disk 1 in its axial direction. Here, the plate thickness of the first extended portions 18B, 18B' is oriented in the Y axis direction (approximately in the radial direction of the disk 1). For example, see FIG. 8. The second extended portions 18C, 18C' are formed by turning up the top sides (rising-up sides) of the first extended portions 18B, 18B' into approximately a V-shape or a U-shape. The second extended portions 18C, 18C' extend aslant toward the side of the curved piece portion 17A (the arm 2A of the mounting member 2) of the abutting plate portion 17, the second extend portions 18C, 18C' being slightly twisted.

At the top end sides of the second extended portions 18C, 18C', the projection portions 18D, 18D' that are approximately hemispherical and project toward the surface side of the abutting plate portion 17 are provided. The projection portions 18D, 18D' are structured so as to make a line contact with, or nearly a point contact with the surface of the abutting plate portion 17. Further, since the hemispherical projection portions 18D, 18D' are adapted to abut to or slidably abut to the surface of the abutting plate portion 17 in an elastically deformed condition, the return springs 18, 18' normally urge the friction pads 10 (the back plate 11) in the return direction, separating from the disk 1. Accordingly, for example, when the braking operation of the vehicle is released, the friction pads 10 are adapted to return to an initial position (a standby position) in a stable manner.

The disk brake according to the embodiments of the present invention is structured as discussed above. Next, its operation will be explained.

First, when braking is applied to the vehicle, braking hydraulic pressures are supplied to the inner leg portion 6A (cylinder) of the caliper 6 so as to slidably deviate the piston toward the disk 1. Accordingly, the inner-side friction pad 10 is pressed to one side of the disk 1. In this condition, since the caliper 6 receives counterforce from the disk 1, the entire caliper 6 is slidably deviated to the inner side relative to the arm 2A of the mounting member 2 whereby the outer leg portion 6C presses the outer-side friction pad 10 to the other side of the disk 1.

Accordingly, the inner-side and the outer-side friction pads 10 can strongly hold each side of the disk 1 therebetween in the axial direction of the disk 1, the disk 1 being rotated in the arrow A direction as shown in FIGS. 1 to 3, whereby baking force can be applied to the disk 1. Further, when braking is released, supply of the hydraulic pressure to the piston will be stopped, so that the inner-side and the outer-side friction pads 10 are separated from the disk 1 so as to return to the non-braking condition again.

Here, when braking is applied or released, as regards the back plates 11 of the friction pads 10, the inclined surfaces 11E, 11E placed right and left are urged in the arrow B directions in FIGS. 2, 3 through the pad urging portions 15C, 16C of the pad springs 15, 16 whereby each of the ear portions 11A of the back plates 11 is pressed as slidably attaching on the upper wall surface of the pad guide 4 at each of the arms 2A, 2A of the mounting member 2 through the guide plates 15A, 16A of the pad springs 15, 16.

Accordingly, in case that the friction pads 10 are shaken due to vibration, etc. during driving in the radial, rotating or circumferential direction of the disk 1, it will be possible to restrain the vibration, etc. by elasticity (or urging force) of the pad urging portions 15C, 16C provided with the pad springs 15, 16. Moreover, when braking is applied, the friction pads 10 will receive braking torque (rotating torque in the arrow A direction) that is applied from the disk 1. Here, since the flat surface portion 11D of the rotating output side keeps contact to the torque receiver 5 of the mounting member 2 through the hanging plate portion 16B of the pad spring 16, the braking torque during braking can be received by the arm 2A on the rotating output side (the torque receiver 5).

Further, when braking is applied, it will be possible to keep each of the ear portions 11A of the friction pad 10 slidably attached to the upper wall surface of the pad guide 4 through the guide plates 15A, 16a of the pad springs 15, 16. Still further, the inner-side and the outer-side friction pads 10 can be smoothly guided in the axial direction of the disk 1 along the guide plates 15A, 16A.

In the present embodiments, the inner-side return spring 18 includes parts such as the fixing portion 18A, the first extended portion 18B, the second extended portion 18C, the wear detecting portion 18E and the like, the inner-side return spring 18 being integrally formed through bend of the metallic plate 19. Among these parts, the first extended portion 18B rises up from the fixing portion 18A (the back surface of the back plate 11) into the Z axis direction that moves away to the outside of the disk 1 in the axial direction. The direction of the plate thickness t of the first extended portion 18B (see FIG. 8) is oriented to be in the Y axis direction (approximately in the radial direction of the disk 1).

Moreover, the second extended portion 18C is bent from the top end of the first extended portion 18B so as to approximately form a V-shape or a U-shape. Here, the second extended portion 18C extends aslant to the side of the curved piece portion 17A (the arm 2A of the mounting member 2) of the abutting plate portion 17, the second extended portion 18C also slightly being twisted. The top end side of the second extended portion 18C is provided with the projection portion 18D, approximately hemispherical, projecting toward the surface of the abutting plate portion 17. Here, the projection portion 18D makes a line contact or nearly a point contact with the surface of the abutting plate portion 17.

Accordingly, the inner-side return spring 18 normally urges the friction pads 10 (the back plate 11) in the return direction that moves away from the disk 1 in such a way that the hemispherical projection portion 18D abuts to or slidably abuts to the surface of the abutting plate portion 17 in an elastically deformed condition. When the braking of the vehicle is released, for example, it will be possible to return the friction pads 10 to an initial position (or a standby position) in a stable manner. Further, the structure of the outer-side return spring 18' is as the same with one of the inner-side return spring 18.

In case of a return spring applied in conventional art, in general, a plate thickness direction (for example, corresponding to the first extended portion 18B) is oriented in the circumferential direction of a disk. Accordingly, in case that a caliper is a twin-bore, or a wear detection portion is provided to the return spring, a mounting space for layout becomes small whereby it makes difficult to arrange the return spring between a mounting member and friction pads.

On the contrary, in the present embodiments, as discussed hereinbefore, the first extended portion 18B of the return spring 18 is structured to rise up from the fixing portion 18A in a direction that moves away toward the outside of the disk 1 in its axial direction. Further, the direction of the plate thickness t of the first extended portion 18B (see FIG. 8) is oriented to the Y axis direction (approximately, in the radial direction of the disk 1). Accordingly, the second extended portion 18C formed by folding the top end side of the first extended portion 18B can extend aslant toward the side of the curved piece portion 17A of the abutting plate portion 17 along the rotation direction of the disk 1, whereby the top end side of the second extended portion 18C can be provided with the approximately hemispherical projection portion 18D that makes a line contact, nearly a point contact, with the surface of the abutting plate portion 17.

As a result, it becomes possible to easily obtain a space on which the return spring 18 is mounted between the ear portion 11A of the friction pads 10 (the back plate 11) and the side of the arm 2A of the mounting member 2. Since only the limited mounting space is needed to mount the return spring 18, it is possible to offer more choices for layout design.

Further, since the second extended portion 18C formed by folding up the top end side of the first extended portion 18B can extend toward the side of the curved piece portion 17A of the abutting plate portion 17 along the rotation direction of the disk 1, it can make the length (the extended length) of the first extended portion 18B and the second extended portion 18C to be longer than the conventional ones. Accordingly, adjustment of spring constant becomes easier, and required strength can also be obtained easily.

Still further, since the top end side of the second extended portion 18C is provided with the projection portion 18D that projects toward the surface side of the abutting plate portion 17 through drawing (pressing), it is possible to make the projection portion 18D to contact against the surface of the abutting plate portion nearly in a point. Accordingly, abutment or sliding movement of the return spring 18 (the projection portion 18D) relative to the abutting plate portion 17 can be smoothed, and wear and damage between the return spring 18 and the abutting plate portion 17 can also be reduced for an extended period.

Moreover, since the return spring 18 is integrally formed with the wear detecting portion 18E, installation errors, etc. can be eliminated compared to a case where a wear detecting portion is separately formed, for example. Accordingly, not only a number of parts can be reduced, but also assembling operationability can be improved. It is needless to say that the outer-side return spring 18' can also obtain the same effects with the inner-side return spring 18.

Based on the above, according to the present embodiments, in case that the caliper 6 is twin-bore, or the wear detecting portions 18E, 18E' are provided to the return springs 18, 18', a mounting space for the return springs 18, 18' can be easily secured between the ear portion 11A of the friction pads 10 (the back plate 11) and the side of the arm 2A of the mounting member 2 thereby being able to offer more choices for layout design.

When braking is released, the friction pads 10 can be returned to a standby point while keeping its position in parallel relative to the disk surface by means of urging force of the return springs 18, 18', whereby the return movement of the friction pads 10 can stabilize. Accordingly, uneven wear, etc. occurred on the friction pads 10 can be reduced, and run-out of pads, braking noises, and the like can be prevented.

Further, in the present invention, in consideration of the inner-side return spring 18, the fixing portion 18A is fixed to the back plate 11 of the friction pads 10 through the caulking portion 11F, and the projection portion 18D provided at the top end side of the second extended portion 18C elastically abuts to the mounting member 2 through the abutting plate portion 17 of the pad spring 15. Accordingly, it is possible for the return spring 18 to be installed to the back plate 11 of the friction pad 10 in advance. In comparison with a case where the return spring is fixed to the mounting member 2 (or, the abutting plate portion 17 of the pad spring 15), for example, not only installation operationability is improved, but also urging force of the return spring 18 can be stably applied to the friction pad 10.

Still further, since the projection portion 18D is formed as a hemispherical convex portion, that is, circular or elliptical, so as to make a line contact with the surface of the abutting plate portion 17, the projection portion 18D can smoothly abut to the surface of the abutting plate portion 17. Thus, supposing that the projection portion 18D of the return spring 18 is slidably moved to a position abutted to the curved piece portion 17A along the surface of the abutting plate portion 17 during braking, the projection portion 18D of the return spring 18 can be prevented from being pulled off by means of the curved piece portion 17A. Accordingly, urging force in the return direction due to the return spring 18 can be stably applied to the friction pad 10.

Furthermore, since the projection portion 18D provided at the top end side of the second extended portion 18C slidably abuts to the surface of the flat abutting plate portion 17, it is possible to prevent for an extended period that the projection portion 18D of the return spring 18 is worn out or damaged due to sliding deviation against the abutting plate portion 17 whereby durability and life-time of the return spring 18 can be expanded while improving reliability thereto. Here, the outer-side return spring 18' can also obtain the same effects with the inner-side return spring 18.

As discussed, the following has been exemplified as the present embodiment, that is, the projection portions 18D, 18D' (the top end sides of the second extended portions 18C, 18C') of the return springs 18, 18' elastically abut to the abutting plate portion 17 of the pad spring 15. However, the present invention is not limited to the embodiment. Instead, for example, it is possible that abutting plate portions separately formed from a pad spring are fixed to a mounting member, and the projection portions 18D, 18D', etc. of the return springs 18, 18' abut to the abutting plate portions. Or, without employing the abutting plate portion 17, etc., it is also possible that the projection portion of a return spring (the top end side of the second extended portion) directly abuts to the end surface (or, the abutting surface for the return spring formed on the mounting member) of the mounting member.

Figure 17:
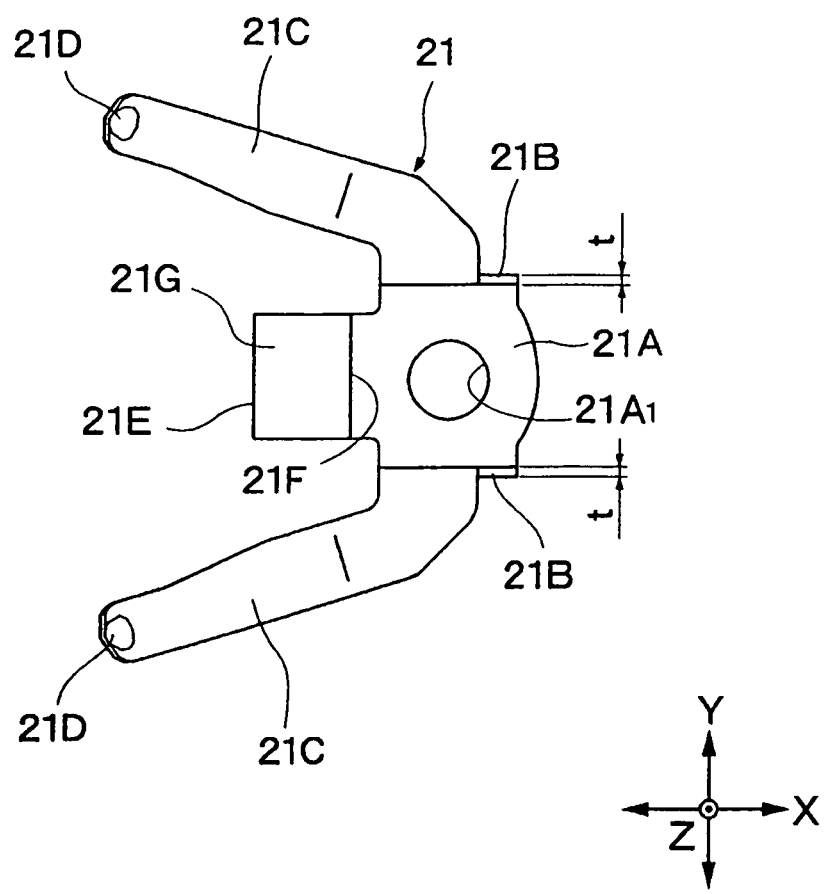
FIG. 17 is an expanded front view showing a modified return spring of the inner side of the disk.

In addition, the following has been also exemplified as the present embodiments, that is, the first extended portion 18B extends relative to the fixing portion 18A of the return spring 18 from a position rather inside of the disk 1 in its radial direction to the axial direction (the Z axis direction) of the disk 1. However, the present invention is not limited to the embodiment. Instead, as a modified example of FIG. 17, for example, it is possible to have totally two pieces of the first extended portions 21B, 21B extending in the Z axis direction relative to the fixing portion 21A of the return spring 21, one of the first extended portion 21B projecting from a position rather inside of the disk 1 in its radial direction, and the other first extended portion 21B projecting from a position rather outside of the disk 1 in its radial direction. The second extended portions 21C, 21C are each formed at the top end sides of the first extended portions 21B, 21B.

In this case, the fixing portion 21A of the return spring 21, the first extended portion 21B, the second extended portion 21C, a projection portion 21D, a wear detection portion 21E, a folding piece portion 21F and a turnover portion 21G are structured approximately the same with the aforementioned return spring 18. However, in the return spring 21, the two pieces of second extended portions 21C are arranged as that the top end sides thereof are gradually separated whereby the projection portions 21D placed on the top end sides of the second extended portions 21C abut to the side of the mounting member at two places. Accordingly, it is possible to secure the position of the pads further stably. The outer-side return spring 18' can be of course modified as the same with the modified example of FIG. 17.

Further, in the aforementioned present embodiments, the case where the return spring 18 is integrally provided with the wear detecting portion 18E, etc. has been exemplified. However, the present invention is not limited to the embodiment. Instead, for example, the wear detecting portion 18E, the folding piece portion 18F and the turnover portion 18G may be formed separately from the return spring 18. These may be connected with each other according to necessities by means of caulking, welding, and the like. The same modification can be applied to the outer-side return spring 18'.

Still further, the cases where the concave pad guide 4 is formed at the arm 2A of the mounting member 2, and the ear portion 11A functioning as the engagement portion of the back plate 11 is formed into a convex shape have been exemplified. However, the present invention is not limited to the embodiments. Instead, for example, it is possible that the concave engagement member may be provided at the back plate of the friction pad, and the convex pad guide may be formed at the arm of the mounting member.

Moreover, in the present embodiments, the case where the base end sides of the return springs 18, 18' are fixed by caulking on the side of the ear portion 11A placed at the rotating input side of the disk 1 and between the left and right ear portions 11A of the back plate 11 has been exemplified. However, the present invention is not limited to the embodiment. For example, the return spring may be arranged at the rotating output side of the disk 1 as the same with the rotating inside side.

In addition, the case of the integral-type pad spring 15 where each of the guide plates 15A, the hanging plate portion 15B and the pad urging portion 15C are provided on the inner-side and the outer-side of the disk, has been exemplified. However, the present invention is not limited to the embodiment. Instead, for example, it is possible that, in lieu of the pad spring 15, two pieces of pad springs formed like divided at the inner-side and the outer-side of the disk 1 may be provided, and each of the pad springs is individually arranged at the inner-side and the outer-side of the disk 1. Here, the same can be applied to the pad spring 16 placed at the rotating output side of the disk 1.

Furthermore, in the present embodiments, the disk brake comprises: the mounting member that extends over the outer periphery of the disk in its axial direction, the mounting member including the pad guide where the friction pads travel; the caliper that is movably attached on the mounting member and presses the friction pads to the disk; and the return spring that is provided between the friction pads and the mounting member and urges the friction pads into a return direction separating from the disk, wherein the return spring is composed of: the first extended portion where the base end side thereof is fixed to the back plate of the friction pad while the top end side thereof extends in a direction separating from the disk; and the second extended portion that is folded from the top end side of the first extended portion toward the side of the mounting member, a top of the second extended portion extending up to a position that elastically abuts to the side of the mounting member, and wherein the plate thickness direction of the first extended portion extends so as to be approximately correspondent with the radial direction of the disk. Based on this structure, it becomes possible that a space to install the return spring can be easily secured between the back plate of the friction pads and the mounting member, and the return spring can be installed into a relatively small mounting space, whereby more choices for layout design can be offered.

Still further, in the present embodiments, the mounting member is provided with the torque receiver at a position that deviates from the pad guide in the radial direction of the disk, the torque receiver receiving braking torque from the friction pad during braking. The top of the second extended portion is then adapted to abut at a position corresponding to the torque receiver of the mounting member.

Furthermore, in the present embodiments, the friction pad is provided with the engagement portion that engages with the pad guide, and the first extended portion is fixed to the engagement portion.

Moreover, the engagement portion is arranged at the central portion of the friction pad in the radial direction of the disk.

In addition, the first extended portion is fixed at the central portion of the friction pad in the radial direction of the disk.

Further, the torque receiver is arranged more inside of the disk in the radial direction than the pad guide.

Furthermore, the friction pad is provided with the engagement portion that engages with the pad guide, and the top of the second extended portion is adapted to abut to the mounting member at a position that deviates from the engagement portion of the back plate in the radial and rotational directions of the disk.

Still further, the top side of the second extended portion is adapted to abut to the mounting portion at a position that is more inside of the disk in its radial direction and more outside of the disk in its rotational direction than the engagement portion of the back plate.

Moreover, the return spring extends from the fixed end of the first extended portion, and is integrally provided with the wear detection portion that detects whether the lining of the friction pad is worn out.

In addition, the top end side of the second extended portion is formed with the convex projection portion that projects toward the side of the mounting member.

Further, since the projection portion is formed as a convex portion, that is, circular or elliptical, so as to make a line contact with the side of the mounting member, it is possible that the return spring (the projection portion) can abut to or slide on the mounting member smoothly whereby wear and damage caused between the return spring (the projection portion) and the mounting member can be reduced for an extended period.

What is claimed is:
1. A disk brake comprising:
a mounting member that extends over an outer periphery of a disk in its axial direction, the mounting member including a pad guide where a friction pad travels;
a caliper that is movably attached on the mounting member and presses the friction pad to the disk; and
a return spring that is provided between the friction pad and the mounting member and urges the friction pad into a return direction separating from the disk,
wherein the return spring is composed of: a first extended portion where a base end side thereof is fixed to a back plate of the friction pad while a top side thereof extends in a direction separating from the disk; and a second extended portion that is folded from the top side of the first extended portion toward a side of the mounting member, a top of the second extended portion extending up to a position that elastically abuts to the side of the mounting member, and
wherein a plate thickness direction of the first extended portion extends along a radial direction of the disk, and the friction pad is provided with an engagement portion that engages with the pad guide, and a top side of the second extended portion abuts to the mounting member at a position that deviates from the engagement portion of the back plate in radial and rotational directions of the disk.

2. The disk brake according to claim 1, wherein the mounting member is provided with a torque receiver at a position that deviates from the pad guide in the radial direction of the disk, the torque receiver receiving braking torque from the friction pad during braking, and a top of the second extended portion is adapted to abut at a position corresponding to the torque receiver of the mounting member.

3. The disk brake according to claim 1, wherein the first extended portion is fixed to the engagement portion and is insertable into the pad guide while the friction pad transfers toward the disk.

4. The disk brake according to claim 3, wherein the engagement portion is arranged at a central portion of the friction pad in the radial direction of the disk.

5. The disk brake according to claim 2, wherein the first extended portion is fixed at a central portion of the friction pad in the radial direction of the disk.

6. The disk brake according to claim 5, wherein the torque receiver is arranged more inwardly inside of the disk in the radial direction than the pad guide.

7. The disk brake according to claim 1, wherein a top side of the second extended portion abuts to the mounting member at a position more inside of the disk in the radial direction and at a position more outside of the disk in the rotational direction than the engagement portion of the back plate.

8. The disk brake according to claim 1, wherein the return spring is integrally formed with a wear detection portion that extends from a fixed end of the first extended portion and detects whether a lining of the friction pad is worn out.

9. The disk brake according to claim 1, wherein a top end side of the second extended portion is formed with a convex projection portion that projects toward a side of the mounting member.

10. A disk brake comprising:
a mounting member that extends over an outer periphery of a disk in its axial direction, the mounting member being provided with pad guides for travel of a friction pad where the pad guides are each separated in a rotational direction of the disk;
a caliper that is movably provided with the mounting member and presses the friction pad to the disk by means of a piston installed; and
a return spring made of a metallic plate that is provided between the friction pad and the mounting member and urges the friction pad in a return direction separating from the disk,
wherein the return spring is composed of: a fixing portion that is fixed to the friction pad; and an extended portion where the extended portion is formed by being bent from the fixing portion as that a plate thickness direction of the extended portion extends along a radial direction of the disk, the extended portion extending in a direction separating from the disk, and a top end side of the extended portion is bent toward a side of the mounting member and elastically abuts to a side of the mounting member, and
the friction pad is provided with an engagement portion at a central portion of the friction pad in the radial direction of the disk, the engagement portion engaging with the pad guide, and a top end side of the extended portion abuts to the mounting member to a position that deviates from the engagement portion of a back plate in inner radial and rotational directions of the disk, the top end side of the extended portion extending toward a rotational direction of the disk.

11. The disk brake according to claim 10, wherein the mounting member is provided with a torque receiver at a position that deviates from the pad guide in an inner radial direction of the disk, the torque receiver receiving braking torque from the friction pad during braking, and a top part of the extended portion is adapted to abut at a position corresponding to the torque receiver of the mounting member.

12. The disk brake according to claim 10, wherein the fixing portion is fixed at the engagement portion.

13. The disk brake according to claim 11, wherein the fixing portion is fixed at a central portion of the friction pad in a radial direction of the disk, and the torque receiver is arranged more inside of the disk in the radial direction than the pad guide.

14. A disk brake comprising:
a mounting member including: pad guides that extends over an outer periphery of a disk in its axial direction for travel of a frictional pad; and torque receivers that receive braking torque from the friction pad, each of the pad guides and each of the torque receivers being arranged in a radial direction of the disk;
a caliper that is movably provided at the mounting member and presses the friction pad to the disk by means of a piston installed;
a return spring made of a metallic plate that is provided between the friction pad and the mounting member and urges the friction pad in a return direction separating from the disk,
wherein the return spring is integrally composed of: a fixing portion that is fixed to the friction pad; an extended portion that extends in a direction separating from the disk relative to the fixing portion where a top end side of the extended portion is folded toward a side of the mounting member and elastically abuts to a region corresponding to the torque receivers of the mounting member in a radial and a rotational direction of the disk; and a wear detecting portion that extends in a direction separating from the disk relative to the fixing portion where a top end side of the wear detecting portion is folded toward a side of the disk so as to make the top end side of the disk abutted to each other for detecting wear of a lining of the friction pad,
wherein a plate thickness direction of a portion of the extended portion that extends in a direction separating from the disk is defined approximately by definable as extending along a radial direction of the disk, and
wherein a plate thickness direction of a portion of the wear detecting portion that extends in a direction separating from the disk is defined approximately by a rotational direction of the disk.

15. The disk brake according to claim 14, wherein each of the torque receivers is arranged more inwardly inside of the disk in its radial direction than each of the pad guides.

16. The disk brake according to claim 15, wherein the fixing portion is fixed at a central portion of the friction pad in a radial direction of the disk.

17. The disk brake according to claim 15, wherein the friction pad is provided with an engagement portion that engages with each of the pad guides at a central portion of the friction pad in a radial direction of the disk, and the fixing portion is fixed to the engagement portion.

18. The disk brake according to claim 8, wherein a plate thickness direction of a portion of the wear detecting portion that extends from the fixed end of the first extended portion is defined by a rotational direction of the disk.

19. The disk brake according to claim 10, wherein the return spring is integrally composed of a wear detecting portion that extends in a direction separating from the disk relative to the fixing portion where the top end side of the wear detecting portion is folded toward a side of the disk so as to make the top end side and the disk abutted to each other for detecting wear of a lining of the friction pad.

20. The disk brake according to claim 19, wherein a plate thickness direction of a portion of the wear detecting portion that extends in a direction separating from the disk is defined by a rotational direction of the disk.

* * * * *